United States Patent
Nishida et al.

(10) Patent No.: US 6,803,115 B2
(45) Date of Patent: Oct. 12, 2004

(54) MANUFACTURING METHOD FOR ORIENTED FILM, POLARIZING FILM, POLARIZING PLATE, AND VISUAL DISPLAY

(75) Inventors: Akihiro Nishida, Ibaraki (JP); Kazuki Tsuchimoto, Ibaraki (JP); Seiji Kondo, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 334 days.

(21) Appl. No.: 10/133,634

(22) Filed: Apr. 29, 2002

(65) Prior Publication Data

US 2003/0062645 A1 Apr. 3, 2003

(30) Foreign Application Priority Data

May 7, 2001 (JP) ......................................... 2001-136111

(51) Int. Cl.[7] ........................ B32B 27/32; B32B 27/00; B29D 7/01
(52) U.S. Cl. ........................ 428/523; 264/1.34; 264/78; 264/288.4; 264/345; 428/500
(58) Field of Search ................................. 428/500, 523; 264/1.34, 78, 288.4, 345

(56) References Cited

U.S. PATENT DOCUMENTS 4,895,769 A * 1/1990 Land et al. .................. 428/483
5,853,639 A * 12/1998 Kawakami et al. ..... 264/177.19

FOREIGN PATENT DOCUMENTS

JP 64-7575 12/1982
JP 2731813 10/1988

* cited by examiner

*Primary Examiner*—Stephen J. Lechert, Jr.
(74) *Attorney, Agent, or Firm*—Westerman, Hattori, Daniels & Adrian LLP

(57) ABSTRACT

An oriented film with a high degree of orientation may be manufactured even a width of master roll film is wider width, by a manufacturing method for an oriented film, comprising steps of stretching an un-oriented polyvinyl alcohol derived film in dry and in longitudinal uniaxial direction by applying tension produced by peripheral velocity difference between rolls, wherein a value of L/W is not more than 0.6 when a distance between rolls defined as L and a width of the un-oriented polyvinyl alcohol derived film is defined as W; and further heating at 60 to 160° C. after the stretching step.

7 Claims, 1 Drawing Sheet

MANUFACTURING METHOD FOR ORIENTED FILM, POLARIZING FILM, POLARIZING PLATE, AND VISUAL DISPLAY

BACKGROUND OF THE INVENTION

1. Field of the Invention

The present invention relates to a manufacturing method for an oriented film of polyvinyl alcohol derived films used for a polarizing film etc. Furthermore, the present invention relates to a polarizing film comprising an oriented film obtainable by the manufacturing method for the oriented film concerned. A polarizing film is used as a polarizing plate etc. for a visual display, such as a liquid crystal display, an organic EL display, a PDP (plasma display panel).

2. Description of the Prior Art

Conventionally, an oriented film of polyvinyl alcohol derived films has been used as a polarizing film for a liquid crystal display etc. As a manufacturing method for the oriented film concerned, a wet type stretching method and a dry type stretching method may be mentioned. Since moisture percentage of a film gives some effects to stretching, in the wet type stretching method, a stretch irregularity is easy to be obtained in an oriented film. On the other hand in the dry type stretching method, since stretching is conducted in a way that tensile stress is given, using a ratio of peripheral velocity between stretching rolls, to a film heated to be stretched at no less than a glass transition temperature, some un-uniformity based on a deformation by the tensile stress may be arisen when the film is stretched thinner, and, as a result, a stretch irregularity may easily obtained. In a polarizing film using the oriented film that has the above described stretch irregularity, problems of color irregularity and performance irregularity may possibly occur. Japanese Patent Publication No. 2731813 and Japanese Patent Publication No.1524033, etc. are proposed to problems of the manufacturing method for oriented film applying above described dry type stretching method.

However, in the above described dry type stretching method, un-oriented film of polyvinyl alcohol derived films used as conventional master roll usually have a width of about 400 to 2700 mm. When a width of un-oriented film of the master roll is wider than this range, necking becomes bigger at the time of stretching, and the width of oriented film obtained becomes narrower. Moreover, orientation irregularity in the width direction, and thickness irregularity may be easily generated, and oriented film with high degree of orientation may not be obtained.

An object of the present invention is to provide a manufacturing method for an oriented film of polyvinyl alcohol derived film with high degree of orientation, applying dry type stretching method, in case a master roll film having a wide width is used.

Moreover, another object of the present invention is to provide a polarizing film using an oriented film obtained by the above described manufacturing method and to provide a polarizing plate, and further to provide a visual display using the above described polarizing film or polarizing plate.

SUMMARY OF THE INVENTION

As a result of repeated examinations carried out wholeheartedly by the present inventors to solve the above-mentioned problems, a manufacturing method of a polarizing film shown below was found out and the present invention was completed.

The present invention relates to a manufacturing method for an oriented film, comprising steps of: stretching an un-oriented polyvinyl alcohol derived film in dry and in longitudinal uniaxial direction by applying tension produced by peripheral velocity difference between rolls, wherein a value of L/W is not more than 0.6 when a distance between the rolls defined as L and a width of the un-oriented polyvinyl alcohol derived film is defined as W; and further heating at 60 to 160° C. after the stretching step.

In the above described present invention in order to control necking, a value of L/W is defined not more than 0.6 according to shorten L, where a distance between rolls, which produce tension for stretching an un-oriented film of polyvinyl alcohol derived film as master roll, is defined as L and a width of the un-oriented film as master roll is defined as W. Thus necking at the stretching step is suppressed. When the value of L/W is larger than 0.6, necking become bigger at the stretching step, and as a result a tendency for the width of oriented film obtained to become narrower. It is preferable to set the distance between rolls further shorter so that the above described value L/W may become not less than 0.2. On the other hand, when the above described value of L/W is set not more than 0.6 and the distance L between rolls is set shorter, an un-oriented film will be stretched in a state with a little necking. However, uniaxial property of the oriented film obtained falls, and orientation falls to generate orientation irregularity in a width direction and thickness irregularity. Therefore, in the present invention, orientation is improved by further applying heat treatment after the above described stretching step. Thus when the width of master roll film becomes wider width, oriented film with highly orientation may be obtained in a way that heat treatment is applied after stretching, while limiting the above described value of L/W and shortening a distance between rolls.

In the above described manufacturing method for an oriented film, it is preferable that the heating step after the stretching step is conducted by heating roll. Heat treatment may be efficiently conducted by heating roll.

In the above described manufacturing method for an oriented film, un-oriented film may have been dyed with iodine or dichroism dyestuff.

Moreover, in the above described manufacturing method for an oriented film, after the un-oriented film is stretched and further applied heat treatment, the oriented film may be dyed with iodine or dichroism dyestuff.

And particularly the present invention relates to a polarizing film comprising an oriented film obtainable by the manufacturing method for the above described oriented film.

And more particularly the present invention relates to a polarizing plate with which an optical transparent protective layer is prepared at least in one side of the above described polarizing film.

Furthermore, the present invention relates to a visual display using the above-described polarizing plate.

DETAILD DESCRIPTION OF THE INVENTION

Figure 1:
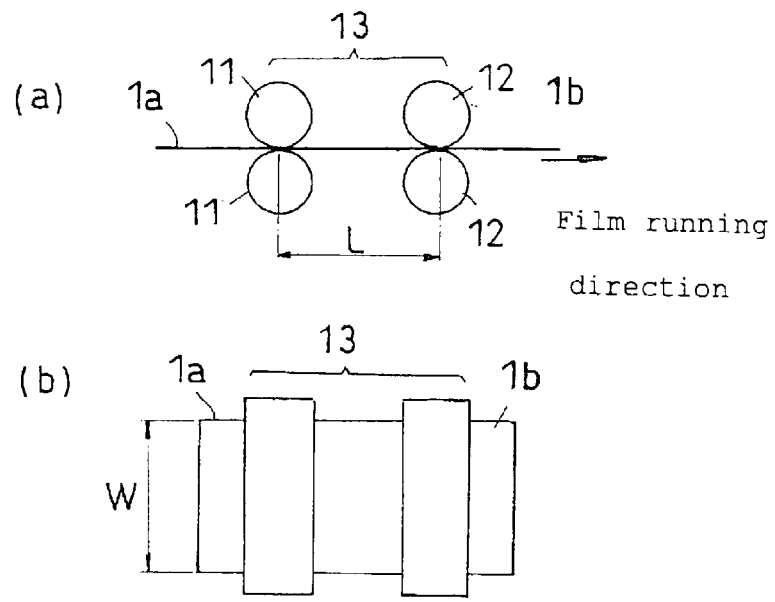
FIG. 1 shows one embodiment of longitudinal uniaxial stretching in a manufacturing method for an oriented film of the present invention.

Polyvinyl alcohols or derivatives thereof are used for a material of a non-stretched film used in a manufacturing method for an oriented film of the present invention. As derivatives of polyvinyl alcohol, in addition to polyvinyl formals, polyvinyl acetals, etc. may be mentioned, and derivatives modified with olefins, such as ethylene and propylene; unsaturated carboxylic acids, such as acrylic acid, methacrylic acid, and crotonic acid; alkyl esters of the above described unsaturated carboxylic acids and acrylamide etc. may be mentioned. Generally, polyvinyl alcohol with approximately 1000 to 10000 of degree of polymerization and approximately 80 to 100 mol % of degree of saponification is used. Although a thickness of a non-stretched polyvinyl alcohol derived film is not especially limited, it is usually approximately 30 to 150 μm. Moreover, a width W is not particularly limited but films with a width about 400 to 3000 mm may be used. And particularly it is preferably useful that the width is 1000 to 2500 mm.

In addition, additives, such as plasticizers, may also be contained in the above described polyvinyl alcohol derived non-stretched film. As plasticizers, polyols and condensates thereof, etc., for example, glycerin, diglycerin, triglycerin, ethylene glycol, propylene glycol, polyethylene glycols, etc. may be mentioned. Although an amount of the plasticizers used is not especially limited, it is preferable to be set no more than 20% by weight in the non-stretched film.

Moisture content is suitably adjusted so that the above described un-oriented film of polyvinyl alcohol derived film may be suitable for the dry stretching method. Moisture content of an un-oriented film of the present invention is preferably not more than 10%. In addition, moisture content is defined as percentage of a moisture weight to a weight of an un-oriented film in absolute dry condition. Although a method for adjusting moisture content of an un-oriented film is not particularly limited, various methods, such as hot air heating method using hot oven for film lines and the like, hot platen heating method using hot platen and the like, radiation heating method using infrared heating and the like, and roll heating system using heating roll and the like may be employable for drying methods. It is preferable that drying temperature is set not less than 50° C. due to merit of productivity. The moisture content is preferably not more than 8%, and more preferably not more than 5%. Moreover, in order to suppress stretch irregularity, moisture content is preferably set not less than 0.5%.

In manufacture of an oriented film of the present invention, un-oriented film of polyvinyl alcohol derived film is subjected to stretch in longitudinal uniaxial direction by applying tension produced by peripheral velocity difference between rolls. The above described film is stretched in a heated state in longitudinal uniaxial direction and made thinner, and an oriented film is obtained. Stretching means is not particularly limited and uniaxial stretching methods by various kinds of dry stretching methods may be conducted. As a stretching method, for example, stretching method between rolls, heating rolls stretching method, and the like may be mentioned. Stretching may also be conducted in multi stage. Stretching ratio of the oriented film is suitably set according to an object, but stretching ratio is 2 to 6 times, preferably 3 to 5.5 times, and more preferably 3.5 to 5 times. Thickness of stretched oriented film is preferably about 5 to 40 μm.

The above described un-oriented film is usually maintained in heated state in the above described stretching step. Heating means is not particularly limited, and various kinds of heating methods for film lines conventionally used may be adopted. In stretching method between rolls, hot air heating method using hot oven and the like, hot platen heating method using hot platen and the like, and radiation heating method using infrared heating and the like, etc. may be adopted as a heating means, and in heating roll stretching method, heating rolls may be used as a heating means. Heating temperature is preferably about 70 to 120° C., and more preferably 90 to 110° C. Since tensile yield point stress of the film approaches breaking stress value when heating temperature is less than 70° C., manufacture of a continuous oriented film becomes difficult. On the other hand, when a heating temperature becomes higher, there is a possibility that evaporation of plasticizer contained in the film may become severe, and moreover, when heating rolls are used as a heating means, float may be formed between the heating roll and the film, and so it is not preferable for uniform stretching. In addition, when heating rolls is used, a surface temperature of heating roll is adjusted within the above described range. Heating rolls may also be prepared two or more. Surface material of heating rolls will not be particularly limited as long as it is the material by which slip does not occur with polyvinyl alcohol film, but metal and ceramics materials are suitable. Moreover, roughness of the surface of heating roll is preferably as close to mirror finish as possible.

Figure 2:
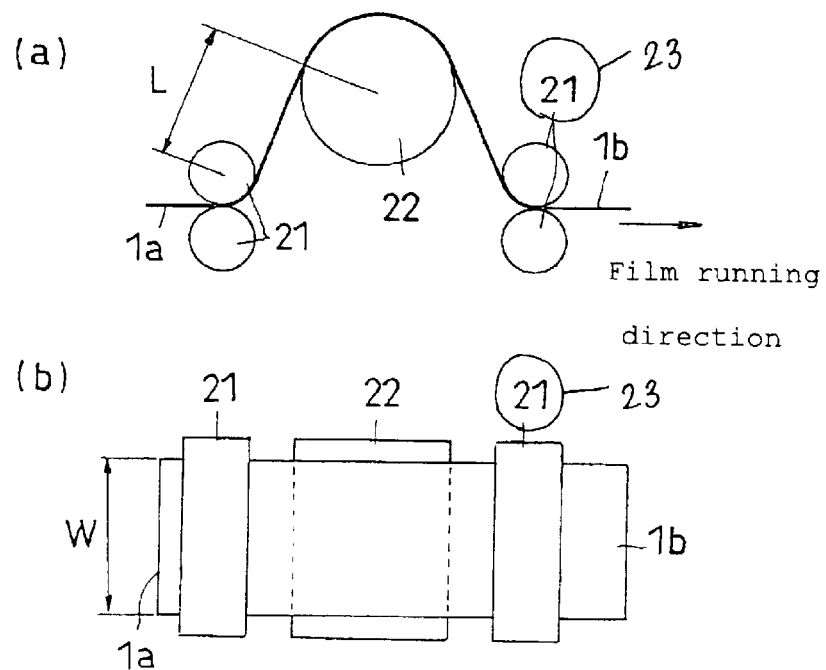
FIG. 2 shows one embodiment of longitudinal uniaxial stretching in a method for manufacturing an oriented film of the present invention.

FIG. 1 and FIG. 2 show an example of conceptual view that the un-oriented film of polyvinyl alcohol derived film is stretched in longitudinal uniaxial directin by applying tension produced by peripheral velocity difference between rolls. Distance L between rolls represents a distance where polyvinyl alcohol derived film is contacted with rolls.

FIG. 1 is a conceptual view of side face (a) and top face (b) where stretching is conducted by peripheral velocity difference between rolls, and oriented film 1b is obtained while an un-oriented film 1a is heated between roll 11 (low speed) and roll 12 (high-speed). As a heating means 13 in FIG. 1, various methods, such as hot air heating type using hot oven and the like, hot platen heating type using hot platen and the like, and radiation heating type using infrared heating and the like, may be adopted. Distance L between rolls of FIG. 1 represents a distance in a straight line between a last contacting point, of roll 11 and polyvinyl alcohol derived film, and a beginning contacting point, of roll 12 and polyvinyl alcohol derived film.

FIG. 2 is a conceptual figure of side face (a) and top face (b) where un-oriented film 1a is heated by heating roll 22 and stretching is conducted by peripheral velocity difference between rolls of roll 22 and roll 21 or roll 23, and oriented film 1b is obtained. When stretching is given by peripheral velocity difference of roll 21 (low speed) and heating roll 22 (high-speed), tension is given backward, and when stretching is given by peripheral velocity difference of roll 23 (high speed) and heating roll 22 (low speed), tension is given ahead. Distance L between rolls of FIG. 2 represents a distance in a straight line between a last contacting point, of roll 21 and polyvinyl alcohol derived film, and a beginning contacting point, of heating roll 22 and polyvinyl alcohol derived film, when tension is given backward. And distance L represents a distance in a straight line between a last contacting point, of heating roll 22 and polyvinyl alcohol derived film, and a beginning contacting point, of roll 23 and polyvinyl alcohol derived film when tension is given forward.

After the above described stretching, heat treatment is given further at 60 to 160° C. to improve orientation. Heat treatment temperature is preferably 80 to 140° C., when effect and efficiency are taken into consideration. As for method of heat treatment, various methods, such as hot air heating type using hot oven and the like, hot platen heating type using hot platen and the like, radiation heating type using infrared heating and the like, and roll heating type using heating roll, may be used. In the above described heating means, since heat treatment may be performed in an instant so that high productivity is acquired, a heating roll method is desirable. Heat treatment period of time is about 2 to 20 seconds.

In the above described manufacturing method for an oriented film, an un-oriented film 1a may have been dyed by iodine or dichroism dyestuff. Moreover, after un-oriented film is stretched and further heat treated, oriented film 1b may also be dyed by iodine or dichroism dyestuff. And the stretched film may also be dyed with iodine or a dichroism dyestuff after stretching and before annealing processing. Although a dyeing method is not especially limited, in using iodine it is common to use an iodine-potassium iodide aqueous solution, and when using a dichroism dyestuff, it is common to use a dyestuff aqueous solution. The oriented film dyed with iodine or dichroism dyestuff is used as a polarizing film. And, the stretched polyvinyl alcohol derived film may be given a durability-enhancing processing by boric acid, etc. The oriented film (polarizing film) to which dyeing, boric acid processing, etc. were given is dried using a usual method.

The above-described polarizing film (polarizer) may be used as a polarizing plate with an optical transparent protective layer prepared at least on one side thereof using a usual method. The optical transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

A hard coat layer may be prepared, or antireflection processing, processing aiming at sticking prevention, diffusion or anti glare may be performed onto the face on which the polarizing film of the above described transparent protective film has not been adhered (the face without the above described application layer thereon).

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing maybe applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness maybe controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarization plate may be used as elliptically polarization plate or circularly polarization plate on which the retardation plate is laminated. A description of the above-mentioned elliptically polarization plate or circularly polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarization plate top or a optical film top using suitable developing methods, such as flow method and coating method, or a method in which an adhesive layer is once formed on a separator, as mentioned above, and is then transferred on a polarization plate or an optical film may be mentioned.

An adhesive layer may also be prepared on one side or both sides of a polarization plate or an optical film as a layer in which pressure sensitive adhesives with different composition or different kind etc. are laminated together. Moreover, when adhesive layers are prepared on both sides, adhesive layers that have different compositions, different kinds or thickness, etc., may also be used on front side and backside of a polarization plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarization plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, inorganic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

Inorganic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Examples concretely showing composition and effect of the present invention will be described, hereafter.

Example 1

A polyvinyl alcohol film (average degree of polymerization 2400) that has thickness of 75 µm and width of 1000 mm was adjusted to 1.5% of moisture in a humidifying oven. With constitution as shown in FIG. 2, a roll (21: low speed) of 250 mm of outside diameter that has 30° C. of surface temperature, and a heating roll of 350 mm of outside diameter (22: high speed) that has 105° C. of surface temperature were installed so that distance between rolls might be set to 100 mm, peripheral velocity was varied, and longitudinal uniaxial stretching of 4.0 times was given to this film. Furthermore, heat treatment was performed for 10 seconds with heating roll of 130° C. of surface temperature, and an oriented film with thickness of 21 µm was obtained.

Example 2

A polyvinyl alcohol film (average degree of polymerization 2400) that has thickness of 75 µm and width of 1000 mm was adjusted to 1.5% of moisture in a humidifying oven. With constitution as shown in FIG. 1, longitudinal uniaxial stretching of 4.0 times was given to this film by heating within 105° C. hot air type oven installed between the two rolls set separated with 300 mm of distance. Furthermore, heat treatment was performed for 10 seconds with heating roll of 105° C. of surface temperature, and an oriented film with thickness of 22 µm was obtained.

Example 3

A polyvinyl alcohol film (average degree of polymerization 2400) that has thickness of 75 µm and width of 400 mm was adjusted to 1.5% of moisture in a humidifying oven. With constitution as shown in FIG. 2, a roll (21: low speed) of 180 mm of outside diameter that has 30° C. of surface temperature, and a heating roll of 180 mm of outside diameter (22: high speed) that has 105° C. of surface temperature were installed so that distance between rolls might be set to 40 mm, peripheral velocity was varied, and longitudinal uniaxial stretching of 4.0 times was given to this film. Furthermore, heat treatment was performed for 10 seconds with heating roll of 105° C. of surface temperature, and an oriented film with thickness of 22 μm was obtained.

Comparative Example 1

A polyvinyl alcohol film (average degree of polymerization 2400) that has thickness of 75 μm and width of 1000 mm was adjusted to 1.5% of moisture in a humidifying oven. With constitution as shown in FIG. 1, longitudinal uniaxial stretching of 4.0 times was given to this film by heating within 105° C. hot air type oven installed between two rolls set separated with 2000 mm of distance. Furthermore, heat treatment was performed for 10 seconds with heating roll of 90° C. of surface temperature, and an oriented film with thickness of 33 μm was obtained.

Comparative Example 2

A polyvinyl alcohol film (average degree of polymerization 2400) that has thickness of 75 μm and width of 1000 mm was adjusted to 1.5% of moisture in a humidifying oven. With constitution as shown in FIG. 2, a roll (21: low speed) of 250 mm of outside diameter that has 30° C. of surface temperature, and a heating roll of 350 mm of outside diameter (22: high speed) that has 105° C. of surface temperature were installed so that distance between rolls might be set to 100 mm, peripheral velocity was varied, and longitudinal uniaxial stretching of 4.0 times was given to this film to obtain an oriented film with thickness of 21 μm. Here, no heat-treatment after drawing was given.

Manufacturing conditions of the above described Examples and Comparative example are shown in Table 1.

TABLE 1

| | Master roll width: W(mm) | Stretching ratio (times) | Distance between rolls: L(mm) | L/W | Heat treatment conditions |
| --- | --- | --- | --- | --- | --- |
| Example 1 | 1000 | 4.0 | 100 | 0.1 | 130° C. × 10 seconds |
| Example 2 | 1000 | 4.0 | 300 | 0.3 | 105° C. × 10 seconds |
| Example 3 | 400 | 4.0 | 40 | 0.1 | 105° C. × 10 seconds |
| Comparative example 1 | 1000 | 4.0 | 2000 | 2.0 | 90° C. × 10 seconds |
| Comparative example 2 | 1000 | 4.0 | 100 | 0.1 | Non |

Width, and Δn (birefringence) in a width direction of the oriented film obtained in Examples and Comparative examples are shown in Table 2. Δn (birefringence): ne: extraordinary ray refractive index and no: ordinary ray refractive index measured, and obtained by Δn=ne−no. In addition, these values were obtained using automatic birefringence meters KOBRA-21ADH made by Oji Scientific Instruments.

TABLE 2

| | Film width of oriented film (mm) | Δn |
| --- | --- | --- |
| Example 1 | 920 | 0.0285 |
| Example 2 | 900 | 0.0282 |
| Example 3 | 360 | 0.0283 |
| Comparative example 1 | 510 | 0.0280 |
| Comparative example 2 | 922 | 0.0241 |

In the Example, the width of the oriented film obtained was not so narrow even when a film master roll that had a large width was used, as shown in Table 2. Moreover, it is admitted that Δn in a width direction of the oriented film is also high and high orientation is obtained.

What is claimed is:

1. A manufacturing method for an oriented film, comprising steps of:

stretching an un-oriented polyvinyl alcohol derived film in dry and in longitudinal uniaxial direction by applying tension produced by peripheral velocity difference between rolls, wherein a value of L/W is not more than 0.6 when a distance between the rolls defined as L and a width of the un-oriented polyvinyl alcohol derived film is defined as W; and further heating at 60 to 160° C. after the stretching step.

2. The manufacturing method for an oriented film according to claim 1, wherein the heating step after the stretching step is conducted by heating rolls.

3. The manufacturing method for an oriented film according to claim 1, wherein an un-oriented polyvinyl alcohol derived film is dyed with iodine or dichroism dyestuff.

4. The manufacturing method for an oriented film according to claim 1, wherein an oriented film is dyed with iodine or dichroism dyestuff after heating.

5. A polarizing film comprising an oriented film obtainable by the manufacturing method for an oriented film according to claim 3 or 4.

6. A polarizing plate with an optical transparent protective layer on at least one side of the polarizing film according to claim 5.

7. A visual display using the polarizing plate according to claim 6.

* * * * *